April 27, 1926. 1,582,038

H. HARRIS

APPARATUS FOR TREATING IMPURE MOLTEN METALS

Filed April 26, 1924  4 Sheets-Sheet 1

Inventor
Henry Harris
By Ward Crosby & Smith
his Attorneys

April 27, 1926.

H. HARRIS

1,582,038

APPARATUS FOR TREATING IMPURE MOLTEN METALS

Filed April 26, 1924

Inventor

Henry Harris

By Ward Crosby & Smith his Attorneys

April 27, 1926.

H. HARRIS

1,582,038

APPARATUS FOR TREATING IMPURE MOLTEN METALS

Filed April 26, 1924

Inventor
Henry Harris
By Ward Crosby & Smith
Attorneys

Patented Apr. 27, 1926.

1,582,038

UNITED STATES PATENT OFFICE.

HENRY HARRIS, OF LONDON, ENGLAND.

APPARATUS FOR TREATING IMPURE MOLTEN METALS.

Application filed April 26, 1924. Serial No. 709,089.

*To all whom it may concern:*

Be it known that I, HENRY HARRIS, a subject of the King of Great Britain, and resident of London, England, have invented certain new and useful Improvements in Apparatus for Treating Impure Molten Metals, of which the following is a specification.

This invention relates to improvements in treating molten metals (and by the term metals I include alloys) and more particularly to apparatus for treating impure molten metals with a reagent.

The method hereinafter described and carried out by the apparatus forms the subject matter of my co-pending application Serial No. 709,088 filed on even date herewith.

In certain known processes for the treatment of impure molten metals to eliminate one or more of the impurities or alloying elements, the molten metallic mass is treated with a molten reagent or reagents which act upon or absorb or otherwise become associated with the contained impurities such as copper, zinc, tin, arsenic, antimony, bismuth and the like. As illustrating a prior process of the character in question reference may be made to the specification of my co-pending application Serial No. 568,632, filed June 15, 1922, wherein as one example a molten mixture of caustic soda and sodium chloride with a suitable oxidizing reagent such as nitrate of soda is used as the reagent for treating molten lead.

In carrying out such processes it is very important if not necessary from an economic standpoint to recover the reagent or reagents from the resulting mixture or mass containing the reagent and impurities. To accomplish this recovery the mixture must be dissolved or brought into a state of solution as with water and the solution of the reagent or reagent mixture, as the case may be, must be separated from the impurities, after which in order to get the reagent into form for further use as a molten reagent, the solution must be evaporated to substantial dryness and then fused.

This evaportion is costly due to the expensive apparatus required and the large amount of space occupied by the same, the cost of conducting the operation and the time required. Also the use of a molten reagent requires apparatus for heating same.

Among the objects of the present invention are, to obviate these expenses and objections inherent in the use of a molten reagent; to otherwise simplify and render more efficient the treatment of the molten metallic mass, and to render possible the efficient use of certain reagents which heretofore could not be used efficiently in the form of a molten reagent.

My invention consists in the novel features of construction, arrangement and combinations of parts, and adaptations of apparatus hereinafter described, by way of example, according to certain specific embodiments thereof. The invention will be more particularly pointed out in the appended claims.

In order that the objects of the invention and the desired functions of the apparatus will be more readily understood, I will first describe the process.

My process generally stated comprises the use of a solution of a reagent or of a mixture of reagents for the treatment of the molten metallic mass. The molten metal and reagent are brought into intimate contact one with another. The heated molten metal may itself be utilized to evaporate the water of the solution either directly by bringing the two materials into direct contact, or indirectly as by causing the molten metallic mass to heat a vessel into which the solution is passed, and preferably into which the molten metal is admitted. Alternatively such vessel may be heated otherwise as for example by the heating medium used to keep the metallic mass molten. In any case the evaporated water in the form of steam or a part of it may be utilized to bring about in suitable manner intimate contact or intermingling of the reagent and molten metal. The spent reagent carrying the impurity or impurities from the metallic mass may then be recovered in molten, semi-molten or solid form as the case may be. This reagent mixed with impurity may then be brought into solution in known manner and the reagent separated therefrom in the form of a solution and again used for another refining operation without being dried or fused.

The process thus not only eliminates the cost and delay incidental to the usual evaporating procedure but it also makes it possible to utilize the heated molten metallic mass to evaporate the water from the reagent solution and utilize the generated steam in the process. It also permits the use of a reagent which is soluble but not readily fusible at temperatures at which metals can be efficiently refined or separated.

I will describe by way of illustration some examples of how the method may be carried out.

I use in solution form a reagent mixture comprising caustic soda, sodium chloride and a suitable oxidizing agent such as nitrate of soda, which I have heretofore used in molten form. This solution is then brought into intimate contact with the molten metallic mass to be refined, say impure molten lead, by having the molten lead kept at a temperature which may be less than 500° C. and forcibly injecting the solution into the lead relying upon the generated steam to force the reagent particles through the mass of the lead, with or without additional stirring. Or as above stated the solution may be fed under pressure into a vessel into which the molten metal is also admitted, and the pressure of steam, generated by evaporation of the solution, utilized to force the molten metal and dehydrated reagent out through a pipe in which they will be intimately intermingled. If desired the pipe may lead to a reagent pot sealed at its lower end by the metal, in which case the metal may be repeatedly passed through the vaporizer and reagent pot; as hereinafter described.

It will be understood that so far as concerns the process, any suitable form of apparatus may be utilized to effect the desired mixing of the soluble reagent and molten metal having due regard to the fact that the molten metal is of much greater specific gravity than the reagent solution.

In the particular example just given any other suitable reagent may be used in solution such for example as the others mentioned in the specification of my said copending United States application Serial No. 568,632.

As further examples of the reagent mixture used by me I may mention for instance in the decoppering of lead as one example, the use of a solution of alkali sulphide or of sulphur dissolved in caustic alkali. As another example I may use for the dezincing of lead a solution of zinc chloride and sodium chloride with or without a suitable oxidizing agent deliberately added to assist the natural oxidizing action of the air to which access is given.

While I have given concrete examples as to the treatment of molten lead by the use of reagents in solution, I do not wish to be understood as limiting my invention in its broader aspects to the treatment of lead by reagent in solution as the invention may be useful in the treatment of other molten metals such for example as copper, tin, etc.

It will be seen from the foregoing description that by the use of this process a smaller amount of an added oxidizer to the reagent may be used because of the oxidizing influence of the steam in certain cases. Since it at times adds greatly to the efficiency of refining some metals to be able to conduct the operations at temperatures at which some reagents do not fuse, it will be seen that this process permits the use of such reagents in the treatment of metallic masses at the desired low temperature.

The invention will be more readily understood by reference to the following description of certain embodiments of the invention, shown in the drawings by way of example.

*Apparatus.*

Referring to the drawings.

Figure 1:
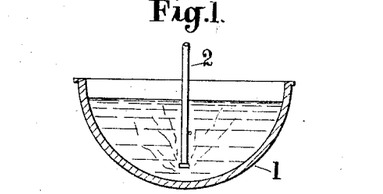
Figure 1 is a diagrammatic sectional elevation of a pot containing a molten metallic mass into which a reagent solution delivery pipe extends.

In Figure 1 of the accompanying drawings the reagent solution is delivered into direct contact with the molten metallic mass in the pot 1 through the open-ended pipe 2 having its free end immersed to a suitable depth below the level of the molten metallic mass. The steam generated by the contact of the reagent solution with the molten metallic mass spreads throughout the latter in rising therethrough and serves to intermingle the reagent with the metal so that an efficient refining of the latter takes place. Instead of a plain or open-ended pipe I may of course provide a rose or other form of distributor at the mouth of the pipe.

Figure 2:
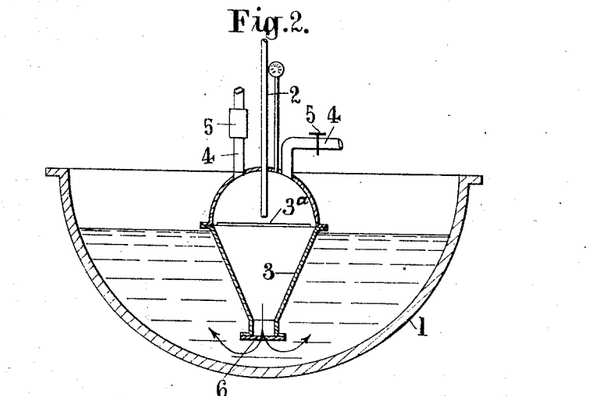
Figures 2 and 3 are diagrammatic sectional elevations of two further arrangements in which provision is made for controlling and utilizing the steam evolved from the reagent solution.

In the modified form of apparatus shown in Figure 2 the heat of the molten metallic mass is utilized for vaporizing purposes indirectly by causing it to heat a vaporizing element which in turn parts with its heat to the reagent solution. In the construction illustrated I immerse or partly immerse a vessel or chamber 3 in the molten metallic mass in the pot 1 and I force the reagent solution preferably in sprayed form into it through the pipe 2. The steam liberated by contact of the solution against the hot walls of the vessel 3 or against a splash plate 3ª or the like therein, creates internal pressure which can be regulated by outlet pipes 4 and valves 5 and thus utilized to force the reagent in dehydrated form out of the vessel and into contact with the molten metallic mass.

Figure 3:
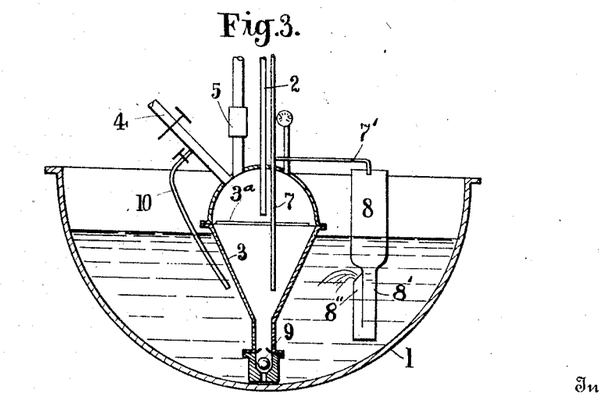

The reagent may be forced out through a hole or outlet valve 6 in the vessel 3 beneath the top of the molten metallic mass in which case the reagent with or without entrained steam will be dispersed upwardly through the molten mass, and the particles of the dehydrated reagent will be caused to intimately intermingle with the molten metal throughout the mass of the same, to bring about the desired reactions in the metal for the purification or other change in the condition of the same. Alternatively as shown in Figure 3 the vessel may have no outlet below the molten mass, so that the steam under pressure in the vessel must force the reagent up an exit pipe 7 extending to a more convenient spot for the reaction, as for example into a reaction chamber 8 in which the molten metallic mass may be circulated through the reagent collected in it by suitable means. If desired the vessel 3 although having no submerged outlet may have a submerged inlet or inlet valve 9 so that the molten metallic mass will periodically well up into the interior of the vessel and be carried over with the reagent according to the general principle of operation of the well know Roesing pump, thereby obviating the necessity of using a separate pump or the like to circulate the molten metallic mass through the reagent or at least supplementing the effect of such pump. As is well understood by those skilled in the art, such a pump operates on the principle of admitting fluid into the compression chamber until the level of the fluid in the chamber rises above a certain outlet passage whereupon pressure in the chamber, which may be brought about by admission of compressed air or the like, closes the valve in the inlet port and forces the fluid out of the chamber through the outlet orifice until the level of the fluid recedes below the outlet orifice whereupon the pressure of the impelling air or other medium in the chamber is reduced and the inlet valve again opens to admit more of the fluid to be pumped until the fluid again rises to the level of the outlet orifice, whereupon the pressure again causes it to be discharged through the outlet orifice, and so on.

Instead of leaving the steam pressure to relieve itself periodically by passing up the exit pipe 7, a rotary ported valve or slide valve or the like (hereinafter described) on the steam outlet pipe 4 or elsewhere, may be provided to permit periodic escape of the steam so that the molten metal will periodically well up into the interior of the vessel without necessitating the depression of the liquid level therein as far as the level of the mouth of the exit pipe.

Whichever constructional form of apparatus is preferred the steam produced can be conveyed to a condenser or used for heating purposes or a part of it may be conducted through a pipe 10 (Fig. 3) to be utilized as a jet to agitate or cause circulation in pot 1, of the molten metallic mass to keep its temperature uniform. It is to be understood, however, that I do not confine myself to this particular method of agitating the molten metallic mass which may for example be and preferably is agitated mechanically, as hereinafter described.

Figure 4:
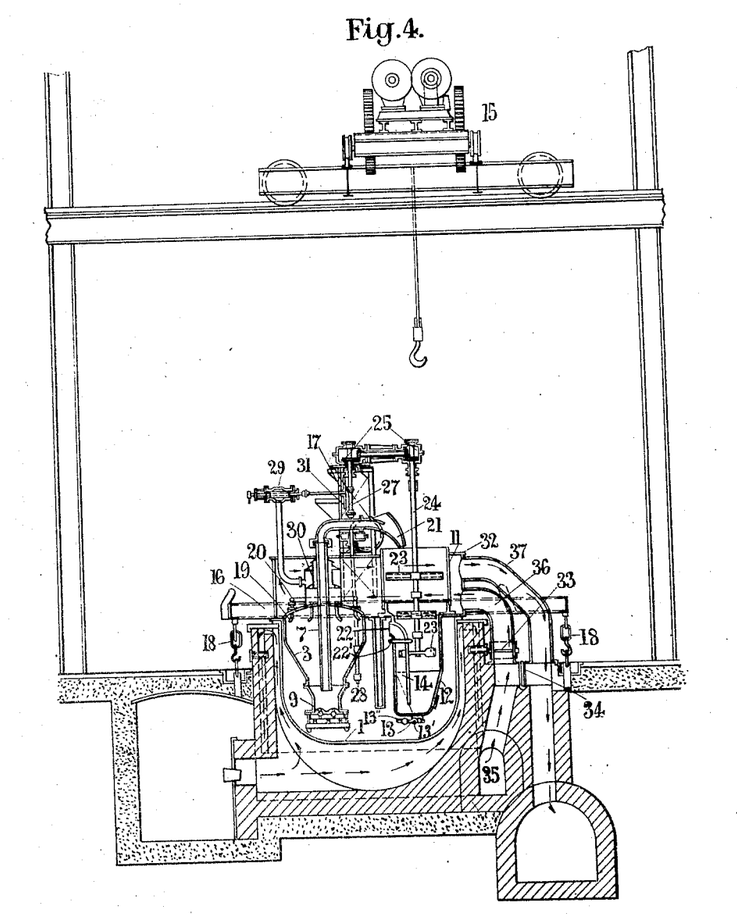
Figure 4 is a somewhat diagrammatic sectional elevation of a complete apparatus operative in accordance with the present invention, Figure 5 being a similar view with certain parts raised and Figure 6 being a plan view illustrating in particular the power transmission mechanism for the moving parts.
Figure 5:
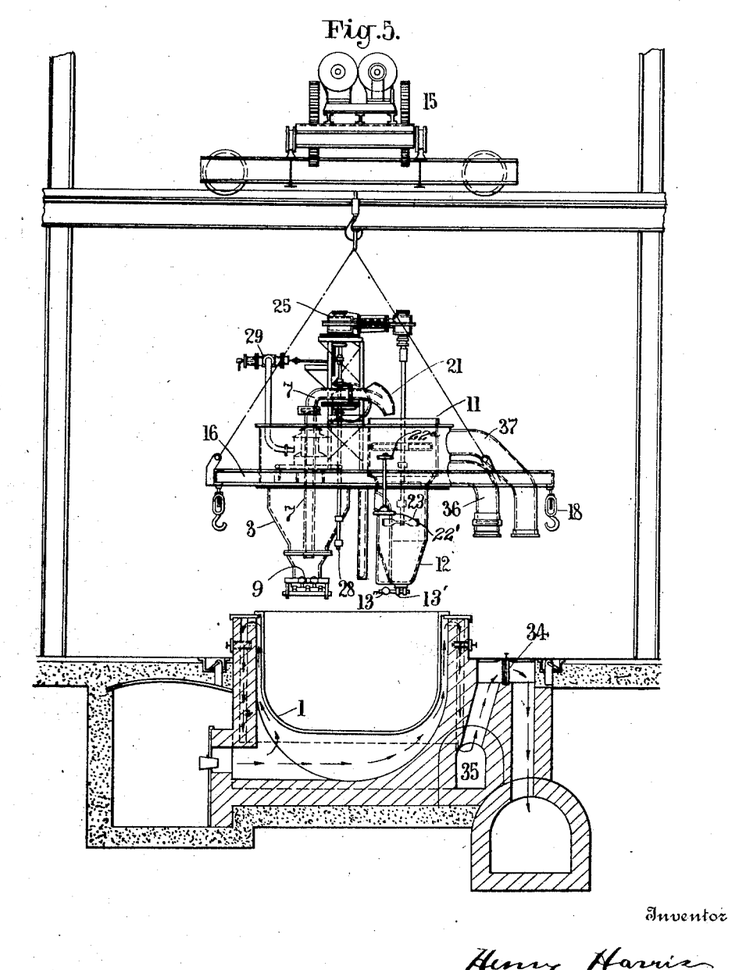
Figure 6:
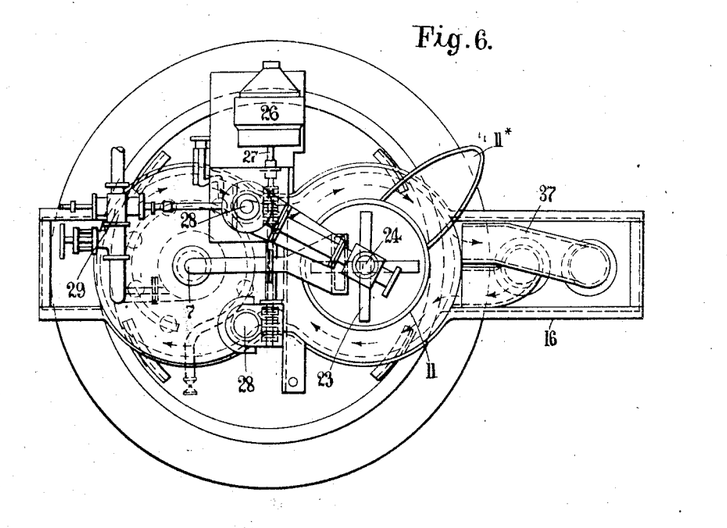

In the complete apparatus as shown in Figures 4, 5 and 6, I utilize the steam generated in the vaporizing vessel 3 by the heated molten metallic mass, to force the molten metal and the reagent (which due to the heat may now be in a fused form) up the exit pipe 7 into an open-ended cylinder 11 surmounting a pot 12 provided with an automatic inlet valve 13 or other suitable valve at its base and a trap or metal seal 14 which prevents the escape of reagent (which may only partially be spent) from cylinder 11 into pot 1, and allows the metallic mass (which may only partially be refined) to pass back freed from reagent, which remains in the cylinder, into the pot 1. In this way the metallic mass is brought into very intimate contact with the trapped reagent which is sealed at its lower end by the molten metal, and may be repeatedly circulated through the reagent by way of the vaporizing vessel 3 up the discharge pipe 7 along with some of the reagent and into the adjacent cylinder 11 now containing reagent, and thence into pot 12 and back to the pot 1, until all the metal in the pot 1 has been refined or attained a desired condition.

This repeated circulation enables a very efficient purification of the molten metallic mass to take place. Moreover, the purification can be effected fractionally by removing the reagent from time to time and introducing fresh batches of the reagent solution, or solutions of different reagents, and if necessary by altering the physical condition somewhat as by a change of temperature. In this way the most easily separated impurity can be removed first substantially uncontaminated with other impurities, which latter can be similarly separated in succession.

In the constructional arrangement of the apparatus shown in Figures 4, 5 and 6, the vaporizing vessel or flash boiler 3 and the reagent cylinder 11 constitute the main elements of a single unit movable from place to place by overhead means such as the crane 15. This unit also comprises a horizontal frame 16 integral with a vertical frame 17 and is firmly held in position on the pot 1 by holding down screw hooks 18. The molten metallic mass to be refined is contained in the pot 1 set in a furnace substantially as described in my United States Patent No. 1,465,128, granted August 14, 1923.

The vaporizing vessel 3 is shown provided at its base with two inlet ball or other suitable valves 9 designed to allow of the entry only of metal and with jets 19 set in a jet ring 20 or other suitable distributing device for conducting or spraying the reagent solution onto the walls of the vaporizer 3. The reagent is delivered to this ring by any suitable connection. To assist in the spraying either compressed air or steam may be used. The mixture of metal and reagent forced through the pipe 7 is delivered into the reagent cylinder 11 by a distributor 21 which may be designed to split up the mixture into thin streams or fine drops.

The valve 13 in the base of the metal seal pot 12 enables the molten metallic mass to pass into the pot when the apparatus is lowered into the molten metal bath, and is adapted to be closed when lifted out of the metal. The valve is mounted on an arm or lever pivoted at 13' and this lever is provided on the opposite side of the pivot from the valve member, with a weight 13" shown in the form of a ball. When the pot is being immersed in the molten metal the bouyant force of the molten metal on the ball weight will counteract the force of gravity on the ball and cause the arm to swing upward on its pivot to open the valve and allow metal to flow from the pot 1 into the metal seal pot 12 until it reaches the level of the metal in the pot 1. When it is desired to lift the pot 12 from the pot 1, as the pot is being lifted the valve will again close due to the presence of metal in metal seal pot 12, in time to prevent any molten reagent that may be in the cylinder 11 from passing out through the valve into the pot 1.

During a refining operation further quantities of metal are delivered into pot 12 from the vessel 3, but it overflows through the port 22 of the metal seal or trap 14. The overflowing molten metal passes back unmixed with reagent into the pot 1 leaving the reagent, which is of less density, in the cylinder 11 where it floats on the surface of the metal trapped in pot 12.

I may provide the port 22 of the pot 12 with a metal seal screw valve 22' provided with a handle 22ª, operated from any convenient position outside the apparatus, so that, when I desire to remove the reagent contained in the cylinder 11 instead of removing the cylinder 11 and its pot 12 bodily from the apparatus, for which provision is made, and then pouring out the reagent, I may partially or entirely close this screw valve, thus preventing a portion or the whole of the metal from flowing out of the outlet port 22 into the pot 1, with the result that the level of the metal, which continues to flow into the cylinder 11, will rise, forcing the molten reagent (which owing to its lower specific gravity floats on the surface of the metal) to overflow from the cylinder 11 over a suitable spout 11ˣ (Fig. 6) into a portable receptacle.

Operating in the cylinder 11 and pot 12 are stirrer arms 23 fixed to a stirrer shaft 24 driven through a gear box 25 by a motor 26 (Fig. 6). This motor further drives through shaft 27 stirrers 28 which serve to stir the molten metal in the bath 1 so as continually to present fresh and hotter molten metal to the external surface of the vaporizer 3. This motor also drives a rotating piston valve 29 which serves, when it is open, to allow of the escape through a separator 30 of the steam generated by evaporation of the reagent solution in the vaporizer 3. The separator 30 is designed to return to the vaporizer any reagent solution entrained with the steam.

The valve 29 has a variable opening which can be regulated during operation and is automatically rotated, its speed of rotating being regulated by a radially shiftable friction disc drive 31.

Some parts of the apparatus which are above the metal bath may be enclosed in a casing 32 which serves, when necessary, to heat the separator 30 and the cylinder 11 by means of the waste furnace gases. For, by opening the damper 33 and closing the damper 34, the furnace gases are conducted from the flue 35 up the inlet flue pipe 36 of the apparatus round the interior of the casing 32 and are drawn through the outlet flue pipe 37, in the direction of the arrow shown in Fig. 4.

Should I not desire thus to heat the apparatus, I may close the inlet flue damper 33 and open the damper 34, when the gases will pass directly from the flue 35 into the main flue as shown by arrows in Fig. 5.

Operation.

In carrying out for instance a refining operation by the use of the complete apparatus above described, assuming that the molten metallic mass to be purified is in the pot 1 and that the movable unit is in the raised position shown in Fig. 5:—

The rotary piston valve 29 is set full open and the movable unit is lowered, whereupon the molten metallic mass rises in vaporizer 3 until it reaches the level of the metal in the pot 1 and at the same time the metallic mass also rises into the metal seal pot 12 until it has attained the same level. The unit is then secured by the holding down screw hooks 18. The motor 26 is then set in motion and the stirrers 23 and 28 are rotated. A solution of a suitable reagent is then introduced through the jets 19 or is otherwise suitably sprayed into the vaporizer 3 under a pressure which may be greater than that of the internal pressure intended to be generated in the vaporizer. The solution is evaporated due to contact with the walls of the vaporizer heated by the molten metallic mass in the pot 1, the reagent is partially or wholly dehydrated, and steam is generated.

If the valve 29 be kept full open, the metal and dehydrated reagent remain in the vaporizer, and steam leaves the apparatus by way of the outlet port of the valve.

If the valve 29 be kept closed, the pressure of steam generated in the vaporizer forces the molten metallic mass with dehydrated reagent up exit pipe 7 until the liquid level in the vaporizer reaches just below that of the bottom end of the said pipe 7 through which the steam can then escape relieving the pressure within the vaporizer and allowing the molten metallic mass to again rise through the inlet valve 9 thereby preventing for the time further escape of steam and causing another increase of pressure within the vaporizer, whereupon the molten metal with dehydrated reagent and steam is again forced up the exit pipe. Thus with valve 29 remaining closed, the intermittent pumping in rapid pulsations of metal from the pot, through valve 9 and up the exit pipe 7 together with dehydrated reagent and steam into the cylinder 11 continues so long as the generation of steam in the vaporizer is maintained.

In most instances however in the refining of metals it is necessary to be able to limit or even prevent the escape of steam mixed with the stream of metal and reagent issuing from the delivery pipe. This object is attained by revolving the piston valve 29 so as to permit of the escape through it of any desired proportion of the steam generated in the vaporizer for prearranged intermittent periods of time. Through adjustment of the action of this valve 29, which adjustment can be effected while the valve is in rotation, the variation of the level of the dehydrated reagent and metal in the vaporizer, which depends upon variations of the internal pressure of steam, can be controlled so that if necessary the level never falls to a point at which steam can leave the vaporizer through the exit pipe 7 the end of which can be kept continuously sealed by metal and dehydrated reagent, metal entering the vaporizer through the valve 9 at its base when the piston valve 29 is open and the metal and reagent being ejected only when the valve 29 is closed, any excess pressure of steam being removed by means of a relief valve (not shown).

The valve 29 is preferably so adjusted and operated that the level of the metal, upon which the reagent floats, is maintained at a little above the level of the pipe opening, so that some metal and reagent will be continuously forced out together, but even if this is not exactly maintained, the fluctuations in the level can be so controlled that the reagent and metal are respectively forced into the pipe at such rapidly recurring short intervals that they are more thoroughly mixed in passing through the pipe than would be the case without such a valve.

The dehydrated reagent in being forced up the exit pipe 7, is brought into very intimate contact with the molten metallic mass which it accompanies, and in some cases the metal may be found to have been completely refined when it issues mixed with the reagent through the distributor 21.

If necessary or desirable a non-return valve may be provided in the exit pipe 7 near its lower end to support the column of liquid therein.

In passing into the cylinder 11 owing to its considerably superior specific gravity the molten metallic mass is separated from the reagent, which remains floating on the top of the molten metal in the metal seal pot 12 through which the metal passes, rises through the syphon trap 14 and emerges from the outlet port 22 returning to pot 1. The pot 12 itself remains full of metal, at least to the level of the outlet port 22 and forms an efficient seal for the supernatant reagent.

When the cylinder 11 becomes full of reagent, it may be emptied by means hereinbefore described and the contents treated for the recovery of the reagent solution for further refining operations and for the impurities which have been absorbed from the metal being refined or separated from its alloying elements.

In certain cases I may arrange during the course of the operation to feed automatically into the cylinder 11 additional substances in a dry molten or gaseous state.

While I have described my invention according to certain particular embodiments thereof, it will be obvious to those skilled in the art, after understanding the invention, that various changes and modifications may be made to better suit the invention to different metals and conditions, and I do not wish to be understood as limiting myself to the particular embodiments herein described, but aim in the appended claims to cover all changes and modifications as may come within the scope of the invention.

In the specification and appended claims I use the terms "molten metal" and "impurities" for brevity and succinctness, but in a broad sense. I wish to be understood by the term "molten metal" as including molten alloys or other molten metallic masses, and by the term "impurities" I wish to be understood as including any substance or element which it is desired to remove from a metal, alloy or molten mass to bring it to a desired state or condition.

What I claim as new and desire to secure by Letters Patent, is:

1. In apparatus for the treatment of molten metal, the combination of a heated container for the molten metal, a vaporizing chamber so located in the container as to be immersed in the molten metal so as to be heated thereby, and means for supplying a solution of a reagent to said vaporizing chamber.

2. In apparatus for treating molten metal, the combination of a heated container for molten metal, a vaporizing chamber so located in the container as to be immersed in the molten metal so as to be heated thereby, and means for supplying a solution of a reagent to said vaporizing chamber in such manner that the vaporizing chamber acts as a flash boiler for the reagent, said vaporizing chamber having an opening below the level of the molten metal in the heated container.

3. In apparatus for treating molten metal, the combination of a vaporizing chamber adapted to be immersed in molten metal so as to be heated thereby, means for supplying a solution of a reagent to said vaporizing chamber, and means for conveying off steam from the vaporizing chamber.

4. In apparatus for treating molten metal, the combination of a vaporizing chamber adapted to be immersed in molten metal so as to be heated thereby, means for supplying a solution of a reagent to said vaporizing chamber, and valve-controlled means for conveying off generated steam from the vaporizing chamber.

5. In apparatus for treating molten metal, the combination of a vaporizing chamber having an inlet opening for a solution of a reagent and having at its lower end an inlet check valve for admitting the molten metal, an outlet passage from said chamber for the discharge of molten metal and reagent, and means for controlling the pressure of generated steam in the chamber.

6. In apparatus for treating molten metal, the combination of a vaporizing chamber having an inlet opening for a solution of a reagent and having at its lower end an inlet check valve for admitting the molten metal, an outlet passage from said chamber for the discharge of molten metal and reagent, and an exhaust pipe with means for controlling pressure of generated steam in said chamber to regulate the admission of molten metal to the chamber and the discharge of molten metal and reagent therefrom.

7. In apparatus for treating molten metal, the combination of a vaporizing chamber having an inlet opening for a solution of a reagent and having at its lower end an inlet check valve for admitting the molten metal, an outlet passage extending down into the intermediate portion of said chamber for carrying off molten metal and reagent, and means for controlling the pressure of the generated steam in the vaporizing chamber.

8. In apparatus for treating molten metal, the combination of a vaporizing chamber having an inlet opening for a solution of a reagent and having at its lower end an inlet check valve for admitting the molten metal, an outlet passage from said chamber for the discharge of molten metal and reagent, and a valve in communication with said chamber and actuated to intermittently increase and decrease the pressure in said chamber to control the inlet of molten metal to the chamber alternately with the discharge of molten metal and reagent therefrom, at rapidly recurring intervals.

9. In apparatus for treating molten metal, the combination of a vaporizing chamber adapted to be immersed in molten metal, an inlet check valve at the lower end of the chamber to admit molten metal, means for supplying a solution of a reagent to the chamber, a reagent container sealed at its lower end with some of the molten metal, and means communicating with the vaporizing chamber for conveying off molten metal and reagent from the chamber, under the impelling pressure of steam generated therein, and discharging the metal and reagent into the reagent container.

10. In apparatus for treating molten metal, the combination of a vaporizing chamber, means for heating the same, means for the admission of molten metal to the chamber, means for supplying a solution of a reagent to the chamber to be vaporized by the heat, a reagent container having its lower end sealed by some of the molten metal and adapted to contain accumulated molten reagent on top of said metal, a pipe having an opening in the vaporizing chamber and communicating with said reagent container and adapted to convey molten metal and reagent from the vaporizing chamber and discharge the same into the molten reagent in the container, a valve communicating with the vaporizing chamber and means for actuating the same so as to intermittently increase and decrease the pressure in the vaporizing chamber to cause the discharge of molten metal and reagent through said pipe to the reagent container, whereby the metal may be circulated through said chamber, pipe and reagent container.

11. In apparatus for treating molten metal, the combination of a heated container for molten metal, a vaporizing chamber adapted to be immersed in the molten metal of the container, an inlet check valve at the lower end of the chamber to admit molten metal from the heated container, means for supplying a solution of a reagent to the chamber, a reagent container having its lower end sealed by some of the molten metal and adapted to contain accumulated molten reagent on top of said metal, a pipe having an inlet opening at the intermediate portion of the vaporizing chamber and communicating with said reagent container and adapted to convey molten metal and reagent from the vaporizing chamber and discharge the same into the reagent container, a valve communicating with the vaporizing chamber and means for actuating the same so as to intermittently increase and decrease the pressure in the vaporizing chamber to cause the discharge of molten metal and reagent through said pipe to the reagent container, whereby the metal may be circulated through said chamber, pipe and reagent container.

12. In apparatus for treating molten metal, the combination of a removable frame adapted to be set over a heated container for molten metal, a vaporizer chamber with an inlet opening at its lower end for admission of molten metal from the container when the chamber is lowered thereinto, means for supplying a fluid to the chamber to effect pressure therein for discharge of the molten metal therefrom, a container for molten reagent adapted to be sealed at its lower end with some of the molten metal, means for conveying the molten metal from the vaporizer chamber and discharging same into the reagent container, and means securing said vaporizer chamber and reagent container to the frame so that they are moved as a unit with the frame, and so positioning them on the frame that they will have their lower ends properly immersed in the molten metal when the frame is set in position over the heated container.

13. In apparatus for treating molten metal, the combination of a removable frame adapted to be set over a heated container for molten metal, a vaporizing chamber having an inlet check valve at the lower end thereof to admit molten metal from the container when the chamber is immersed in the molten metal, means for supplying a solution of a reagent to the chamber, a container for molten reagent adapted to be sealed at its lower end with some of the molten metal a pipe having an inlet opening to the vaporizing chamber and communicating with said reagent container and adapted to convey molten metal and reagent from the vaporizing chamber and discharge the same into the reagent container, a valve communicating with the vaporizing chamber, means for actuating the valve so as to intermittently increase and decrease the pressure in the vaporizing chamber to cause the discharge of molten metal and reagent through said pipe to the reagent container, and means securing said vaporizing chamber, valve mechanism, reagent container and communicating means to the frame as an operative unit so that they are moved as a unit with the frame, and so positioning the vaporizing chamber and reagent container on the frame that they will have their lower ends properly immersed in the molten metal when the frame is set in position over the heated container.

14. In apparatus for treating molten metal, the combination of a heated container for molten metal, a vaporizing chamber so located in the container as to be immersed in the molten metal so as to be heated thereby, and having an inlet opening for a solution of a reagent and having at its lower end an inlet check valve for admitting the molten metal, and an outlet passage from said chamber for discharge of molten metal and reagent impelled from the chamber by the steam generated therein due to evaporation of the reagent solution.

15. In apparatus for treating molten metal, the combination of a pot for the molten metal, a container for molten reagent lighter than the molten metal, means for discharging molten metal into the container, said container having a discharge opening communicating with its lower end and sealed by some of the molten metal, and a valve controlling the discharge opening to regulate the flow of molten metal from the container whereby when the valve is closed sufficient molten metal will accumulate in the pot to cause the molten reagent to overflow therefrom.

16. In apparatus for treating molten metal, the combination of a pot for the molten metal, a container for molten reagent lighter than the molten metal, a vaporizing chamber having an inlet opening for a solution of said reagent and having at its lower end an inlet check valve for admitting the molten metal, an outlet passage from said chamber for the discharge of molten metal and reagent into said reagent container, said container having a discharge opening communicating with its lower end and sealed by some of the molten metal, and a valve controlling the discharge opening to regulate the flow of molten metal from the container whereby when the valve is closed sufficient molten metal will accumulate in the pot to cause the molten reagent to overflow therefrom.

17. In apparatus for heating molten metal, the combination of a pot for the molten metal, a container for molten reagent adapted to have its lower end immersed in the molten metal of the pot, means for discharging the molten metal into the container, said container having a discharge opening communicating with its lower end for discharging molten metal from the container into the pot, and having a valve closing its lower end and adapted to be automatically opened when the bottom of the container is being immersed in the molten metal to permit some of the molten metal to flow into the container.

In testimony whereof I have signed my name to this specification.

HENRY HARRIS.